(12) United States Patent
Wilson

(10) Patent No.: US 8,011,842 B2
(45) Date of Patent: Sep. 6, 2011

(54) APPARATUS FOR ERGONOMIC TYPING

(76) Inventor: Robert D. Wilson, Rural Hall, NC (US)

( * ) Notice: Subject to any disclaimer, the term of this patent is extended or adjusted under 35 U.S.C. 154(b) by 690 days.

(21) Appl. No.: 12/110,939

(22) Filed: Apr. 28, 2008

(65) Prior Publication Data

US 2009/0269118 A1 Oct. 29, 2009

(51) Int. Cl.
*B41J 5/00* (2006.01)
(52) U.S. Cl. ......... 400/486; 400/484; 400/488; 400/489
(58) Field of Classification Search .......... 400/484, 400/485, 486, 488, 489; 345/169
See application file for complete search history.

(56) References Cited

U.S. PATENT DOCUMENTS

| | | |
|---|---|---|
| 5,410,333 A | 4/1995 | Conway |
| 6,288,709 B1 * | 9/2001 | Willner et al. ................ 345/169 |
| 6,370,018 B1 | 4/2002 | Miller, Jr. et al. |
| 6,587,094 B2 | 7/2003 | Anderson |
| 6,717,075 B1 | 4/2004 | Stavely et al. |
| 6,939,066 B2 * | 9/2005 | Goodenough ................ 400/477 |
| 6,983,175 B2 * | 1/2006 | Kwon ........................ 455/575.1 |
| 7,010,333 B2 | 3/2006 | Trively |

FOREIGN PATENT DOCUMENTS

JP 19800059426 12/1981

OTHER PUBLICATIONS

Boyle, "Science Fair for Grown-Ups," Cosmic Log, http://cosmiclog.msnbc.msn.com, pp. 1-6 (Mar. 4, 2008).

* cited by examiner

*Primary Examiner* — Matthew G Marini
(74) *Attorney, Agent, or Firm* — Jenkins, Wilson, Taylor & Hunt, P.A.

(57) ABSTRACT

The subject matter described herein includes an apparatus for ergonomic typing. The apparatus includes a first surface having first set of keys including a plurality of alphabetic keys, where the first set of keys is operable by a user's thumbs. The apparatus includes a second surface having a second set of keys including a plurality of alphabetic keys, where the second set of keys is operable by the user's fingers. The second surface includes first structures for home positioning of fingers of the user's left and right hands and second structures for positioning of the fingers of the user's left and right hands when moving to and from home position keys during typing.

25 Claims, 11 Drawing Sheets

APPARATUS FOR ERGONOMIC TYPING

TECHNICAL FIELD

The subject matter described herein relates to keyboards, keypads, and devices that incorporate keyboards and keypads. More particularly, the subject matter described herein relates to an apparatus for ergonomic typing.

BACKGROUND

Keyboards and keypads are user input devices by which a user interacts with an electronic device, such as a computer or an appliance. Alphanumeric keyboards and keypads contain alphabetic and numeric keys to allow a user to input alphanumeric characters. The most common alphanumeric keyboard configuration is the QWERTY configuration, named for the first six characters of the uppermost row of alphabetic keys. The QWERTY keypad configuration is used on a variety of devices, including stand-alone keyboards, mobile phones, smart phones, and PDAs.

Most typical keyboards and devices include a set of QWERTY keys located on a surface of the device that faces the user. For example, on a stand-alone computer keyboard, the QWERTY configuration is used on a surface where the user can see all of the QWERTY keys and the user types with all five digits of each hand on the visible keyboard surface. One problem with stand-alone keyboards with user-facing QWERTY key configurations is that the user's hands are required to be suspended while typing, causing stress and possible injury to the user's hands and wrists. Another problem with the QWERTY keyboard configuration is that it is suboptimal for typing speed because motion is wasted using hand and finger movement rather than mainly finger movement.

Yet another problem related to typing speed with regard to portable keyboards and devices that incorporate keyboards is that some devices, such as mobile phones and PDAs, are designed so that the user is required to type with the user's thumbs. For example, a mobile phone with a user-facing QWERTY keyboard requires that the user support the keyboard with the user's fingers and type on the front of the keyboard with the user's thumbs. Alternatively, the user may place the device on a surface and type with the user's fingers. Either method of using such a device results in slow typing and stress on the user's hands and wrists.

Due to space constraints on portable devices, folding keyboards and two-sided keyboards have been developed. However, none of such devices has an optimal keyboard configuration that reduces stress and movement of the user's hands while typing. In addition, none of such devices have reliable structures for home positioning a user's fingers on a surface that is not visible by the user. Furthermore, none of such devices have reliable structures for informing the user where the user's fingers are located while typing on a surface that is not visible by the user.

In light of these difficulties, there exists a need for an apparatus for ergonomic typing.

SUMMARY

The subject matter described herein includes an apparatus for ergonomic typing. The apparatus includes a first surface having first set of keys including a plurality of alphabetic keys, where the first set of keys is operable by a user's thumbs. The apparatus includes a second surface having a second set of keys including a plurality of alphabetic keys, where the second set of keys is operable by the user's fingers. The second surface includes first structures for home positioning of fingers of the user's left and right hands and second structures for positioning of the fingers of the user's left and right hands when moving to and from home position keys during typing.

BRIEF DESCRIPTION OF THE DRAWINGS

Preferred embodiments of the subject matter described herein will now be explained with reference to the accompanying drawings of which.

DETAILED DESCRIPTION

Figure 1A:
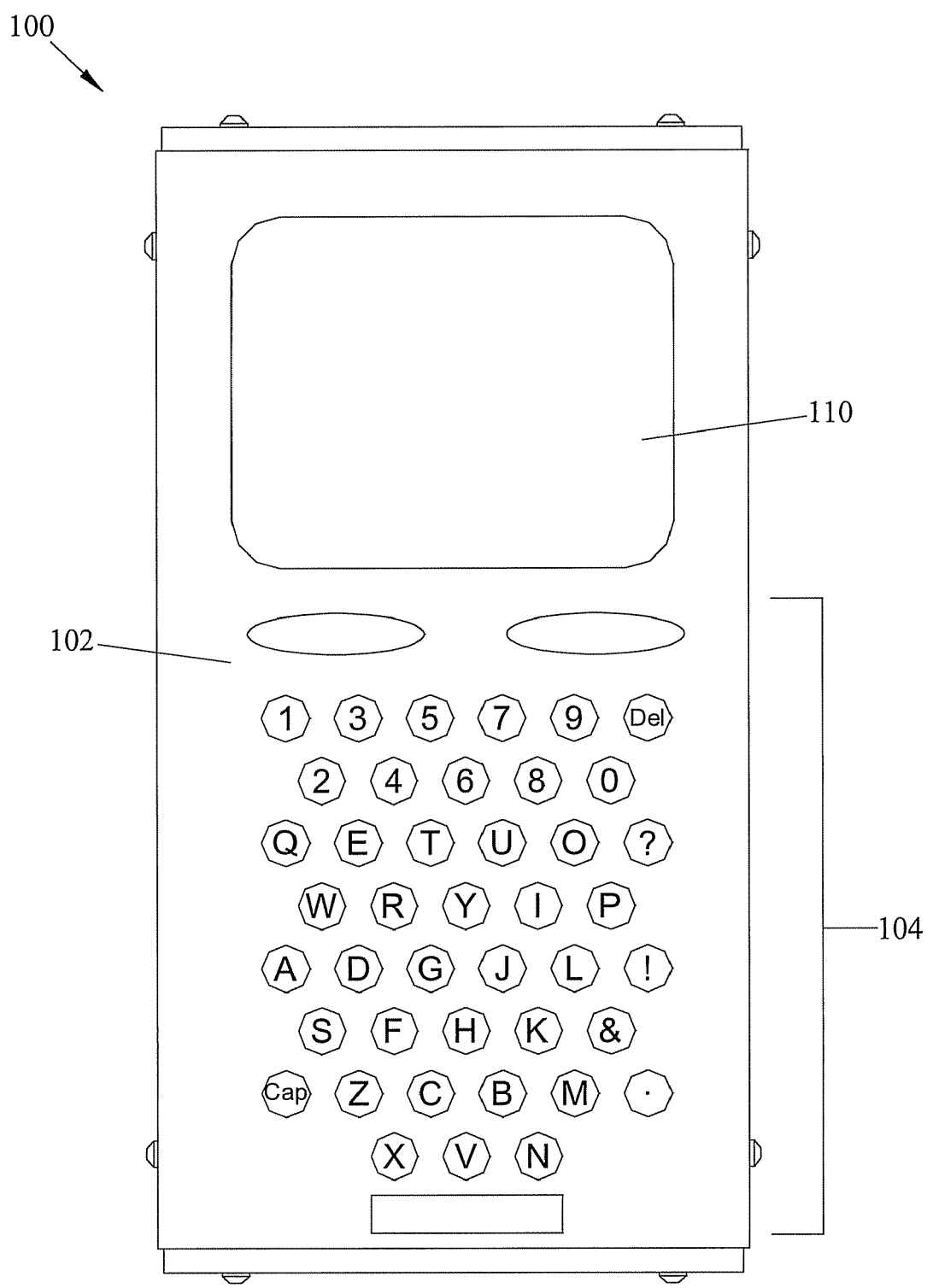
FIG. 1A is a front view of an apparatus of ergonomic typing according to an embodiment of the subject matter described herein.
Figure 1B:
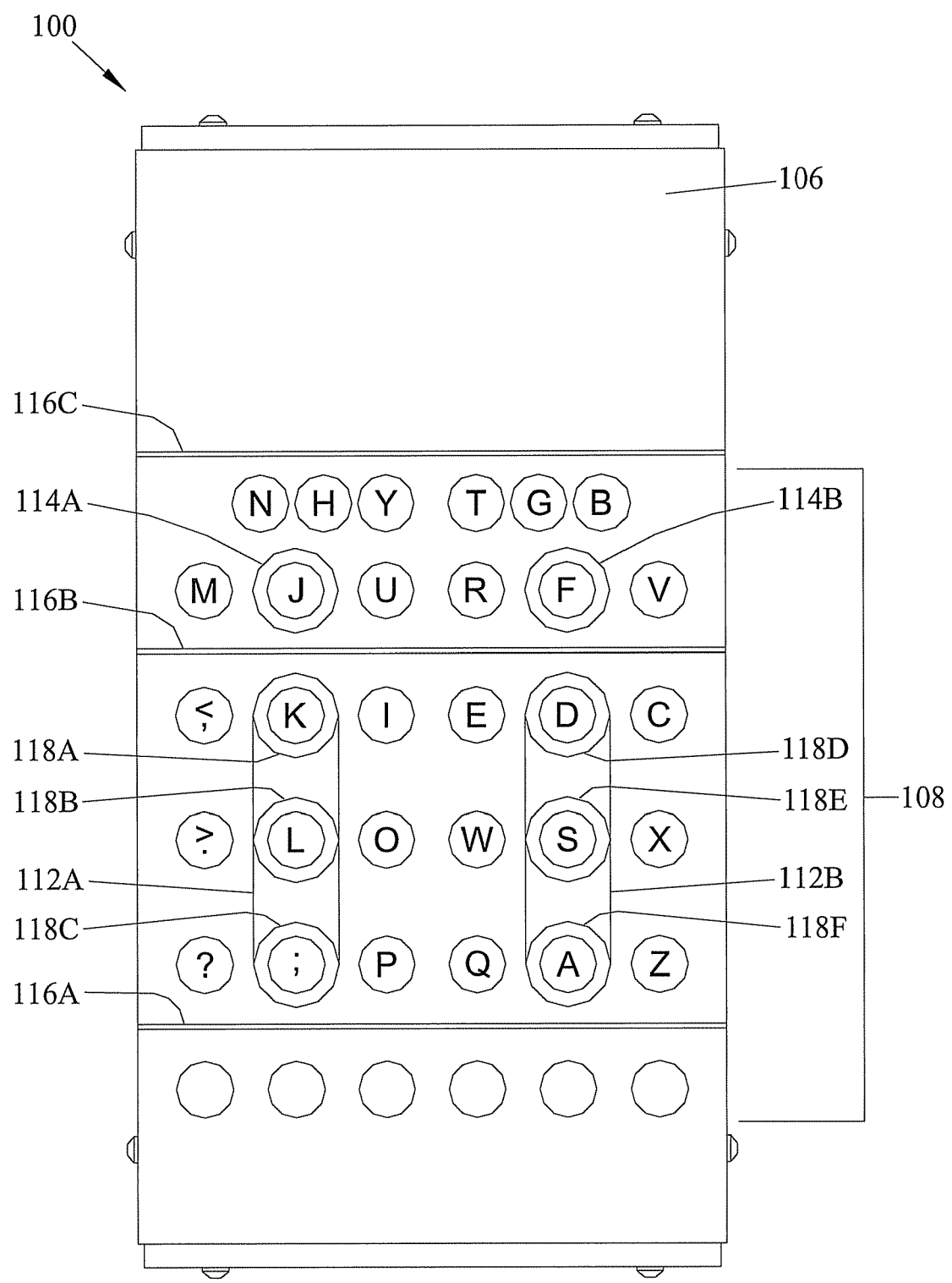
FIG. 1B is a rear view of an apparatus for ergonomic typing according to an embodiment of the subject matter described herein.

An apparatus for ergonomic typing according to an embodiment of the subject matter described herein includes keys on at least two surfaces where the keys are oriented to reduce stress on a user's hands and wrists and for faster typing. FIG. 1A is a front view and FIG. 1B is a rear view of an apparatus for ergonomic typing according to an embodiment of the subject matter described herein. Referring to FIGS. 1A and 1B, apparatus 100 includes a first surface 102 with a first set of keys 104. First surface 102 may be the front surface of the device that is visible by a user during normal operation. Keys 104 may be arranged in suitable configuration. In one embodiment, keys 104 can be configured in a substantially QWERTY configuration, as illustrated in FIG. 1A. In alternate embodiments, non-QWERTY configurations may be used. Keys 104 may include alphabetic keys, numeric keys, spacebar keys, and function keys. A display 110 may be viewable from the same direction as first surface 102. When keys are selected, the corresponding character may be displayed by display 110.

Figure 1C:
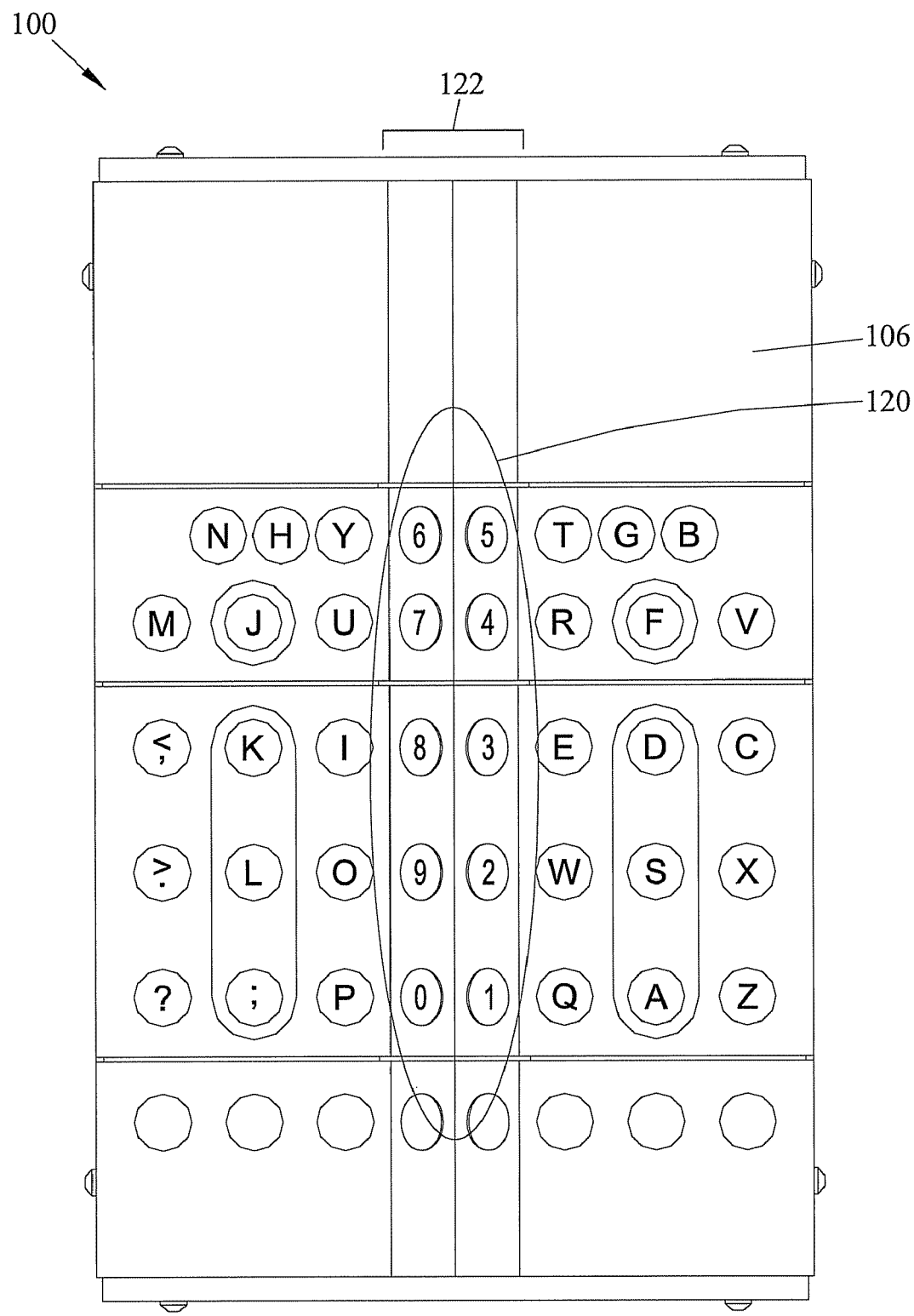
FIG. 1C is a rear view of an apparatus for ergonomic typing where numeric keys are included on the back surface of the apparatus according to an embodiment of the subject matter described herein.
Figure 1D:
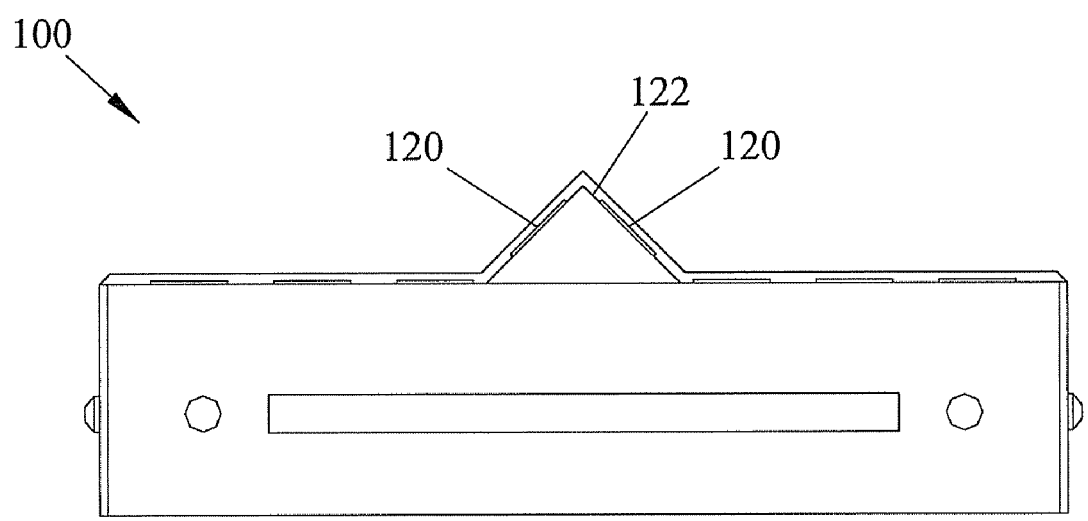
FIG. 1D is a bottom view of the apparatus illustrated in FIG. 1C according to an embodiment of the subject matter described herein.

As illustrated in FIG. 1B, apparatus 100 also includes a second surface 106 with a second set of alphabetic keys 108. Alphabetic keys 108 may be arranged in a non-QWERTY configuration and may repeat at least some of the keys in the first set. In one embodiment, keys 108 may include alphabetic keys and may not repeat the numeric keys on the front surface of the device. In an alternate implementation, the numeric keys on the front surface of device 100 may be repeated on the back surface. One disadvantage to repeating the numeric keys on the back surface is that lateral and vertical movement of the user's hands may be required in order to access the keys in some numeric key configurations. In the exemplary configuration illustrated in FIG. 1B, lateral and vertical movement of the user's hands is not required because numeric keys are not repeated on back surface 106. In an alternate embodiment, as illustrated in FIG. 1C, numeric keys that appear on front surface 102 (illustrated in FIG. 1A) are repeated on back surface 106. Back surface numeric keys 120 include two columns of numeric keys located on a raised structure 122 of back surface 106 located between the left hand and right hand alphabetic keys. An exemplary profile of raised structure 122 is illustrated in the bottom view shown in FIG. 1D. It can be seen from FIGS. 1C and 1D that raised structure 122 includes two portions that extend angularly towards each other. One benefit of locating numeric keys 120 on the angularly extending portions of raised structure 122 is that numeric keys can be included on back surface 106 without increasing the width over the embodiment illustrated in FIG. 1B where numeric keys are not included on back surface 106. In the configuration illustrated in FIGS. 1C and 1D, the numeric keys and the remaining keys located on back surface 106 can be operated with minimal finger movement; i.e., without requiring substantial lateral or vertical movement of the user's hands.

In FIG. 1B, in one embodiment, the N, H, Y, T, G, and B keys are positioned to be operated by the users' index fingers. In the illustrated example, the spacing between the index finger operated keys is less that the spacing between the remaining keys on back surface 106. Positioning the index finger operated keys closer together than the remaining keys facilitates operation of these keys without requiring substantial hand movement by the user.

Figure 1E:
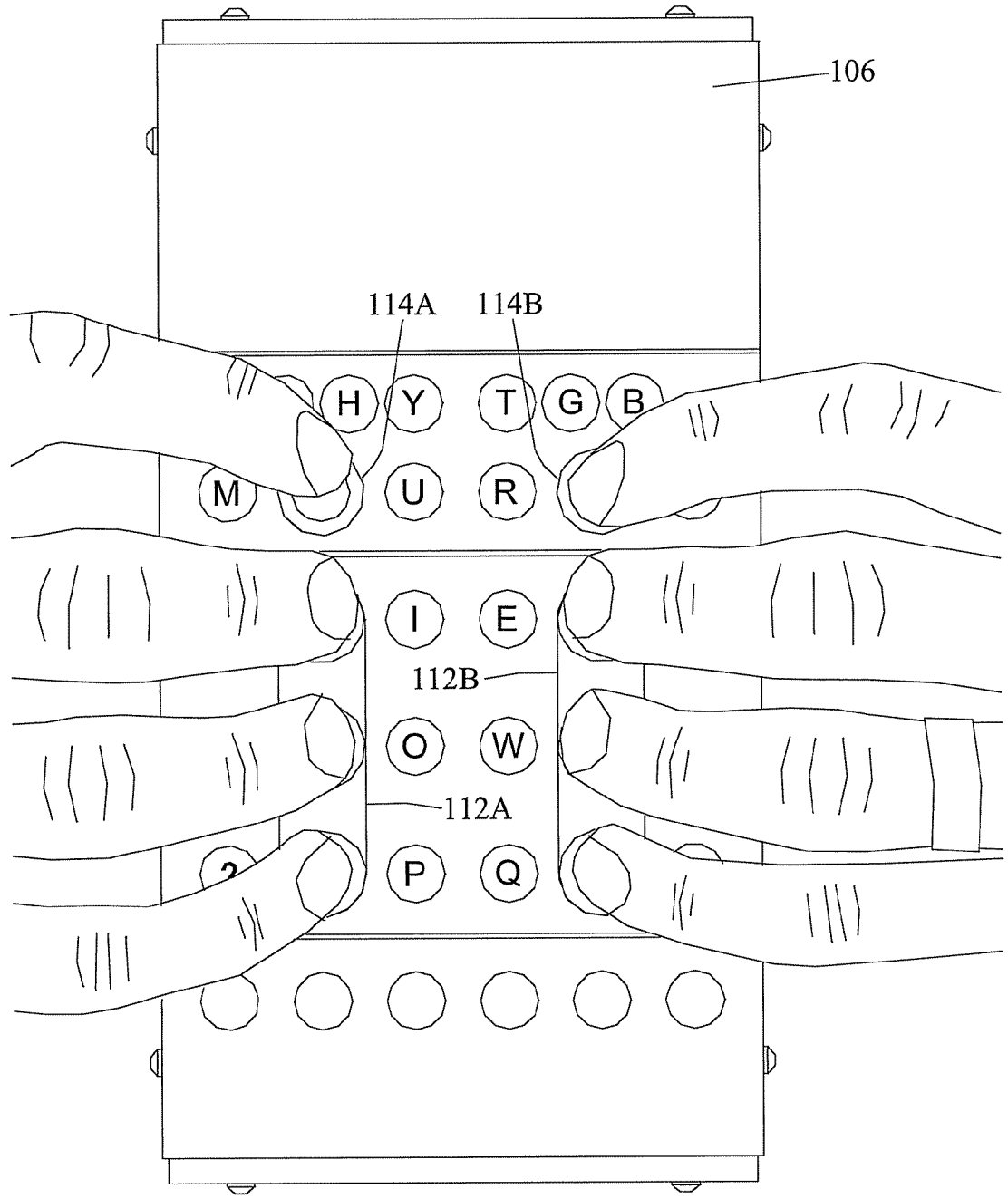
FIG. 1E is a rear view of an apparatus for ergonomic typing illustrating home positioning of the user's fingers on the rear surface according to an embodiment of the subject matter described herein.

According to one aspect of the subject matter described herein, back surface 106 may include right hand and left hand digits three through five home positioning channels 112A and 112B for respective home positioning of the user's right and left hands and right hand and left hand index finger home positioning channels 114A and 114B for respective home positioning of the user's right and left index fingers. Separating the index finger home positioning channels from the digits three through five home positioning channels may increase the likelihood that the user will correctly vertically position the user's hands. Referring to FIG. 1E, digits three through five of the user's right hand are positioned in channel 112A, digits three through five of the user's left hand are positioned in channel 112B, the index finger of the user's right hand is positioned in channel 114A, and the index finger of the user's left hand is positioned in channel 114B.

Channels 112A, 112B, 114A, and 114B may be considered structures formed in or on the second surface for facilitating home positioning of the user's fingers. As used herein and as understood in the keyboard art, "home positioning" refers to an initial position of the user's fingers. For example, on a standard QWERTY keyboard, the home position of the user's fingers is on or suspended above the ASDFJKL; keys. The J and F keys on some QWERTY keyboards include dashes for home positioning of the user's index fingers. However, QWERTY keypads lack structures for positioning digits three through five or for positioning of a user's fingers as they move to and from the home position during typing. As will be described in more detail below, the present subject matter includes additional structures for facilitating positioning of a user's fingers during typing as they move to and from the home position. Such structures are particularly advantageous when the keys are located on a surface that is not visible to the user during typing, such as second surface 106.

Figure 1F:
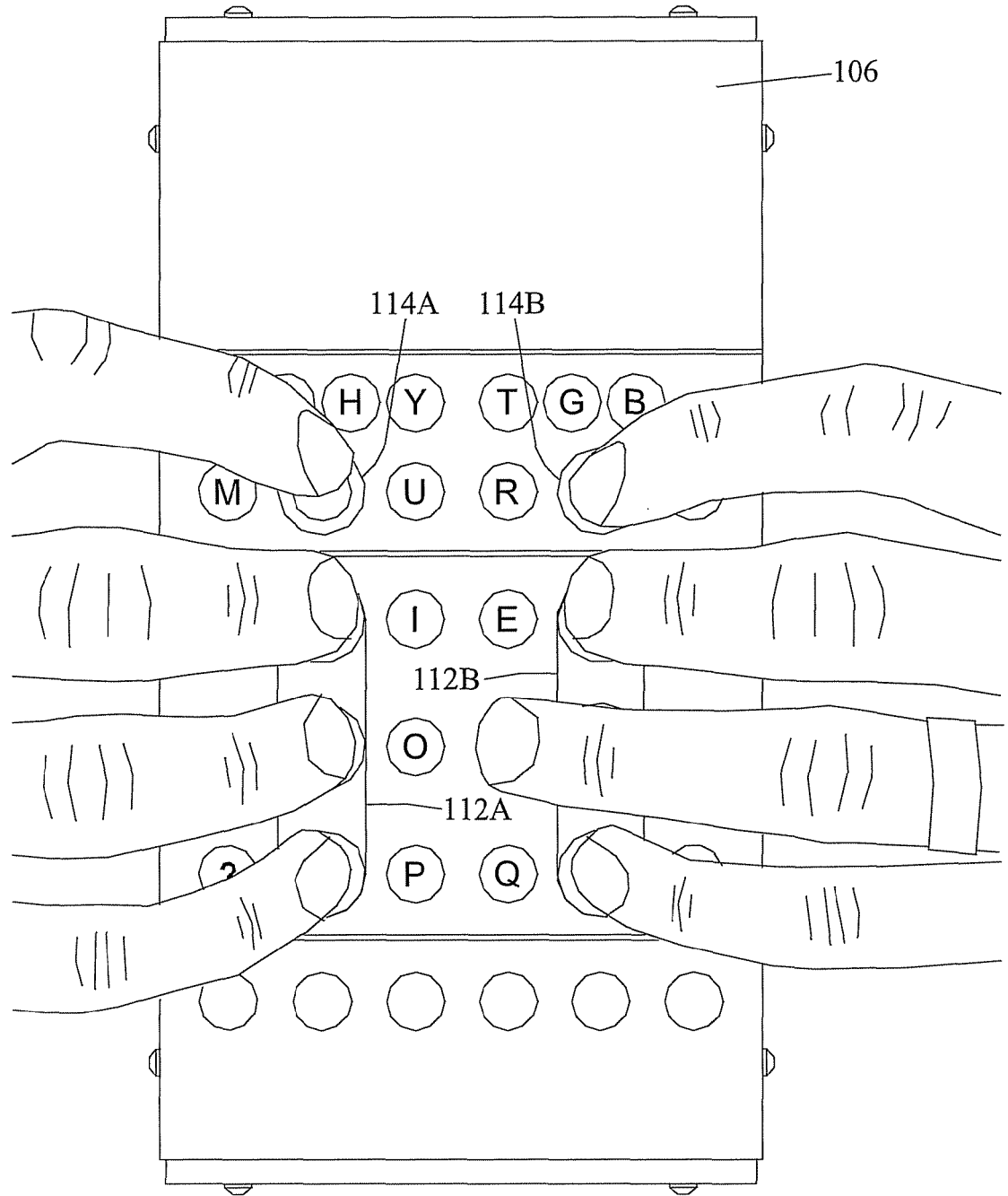
FIG. 1F is a rear view of an apparatus for ergonomic typing illustrating typing by the user without substantial lateral and vertical movement of the user's hands according to an embodiment of the subject matter described herein.

As stated above, one advantage of the configuration of keys on back surface 106 is that lateral and vertical movement of the user's hands is minimally required in order to access any of the alphabetic keys. This feature allows you to hold the device and type on the device at the same time. This is illustrated in FIG. 1F. Referring to FIG. 1F, the user accesses a key outside of digits three through five home positioning channel 112B by simply moving the user's left hand ring finger. Lateral and vertical movement of the user's hand is minimally required. In addition, the need for a strap or other means of supporting apparatus 100 in order to type with all five digits of each hand is eliminated.

Figure 2:
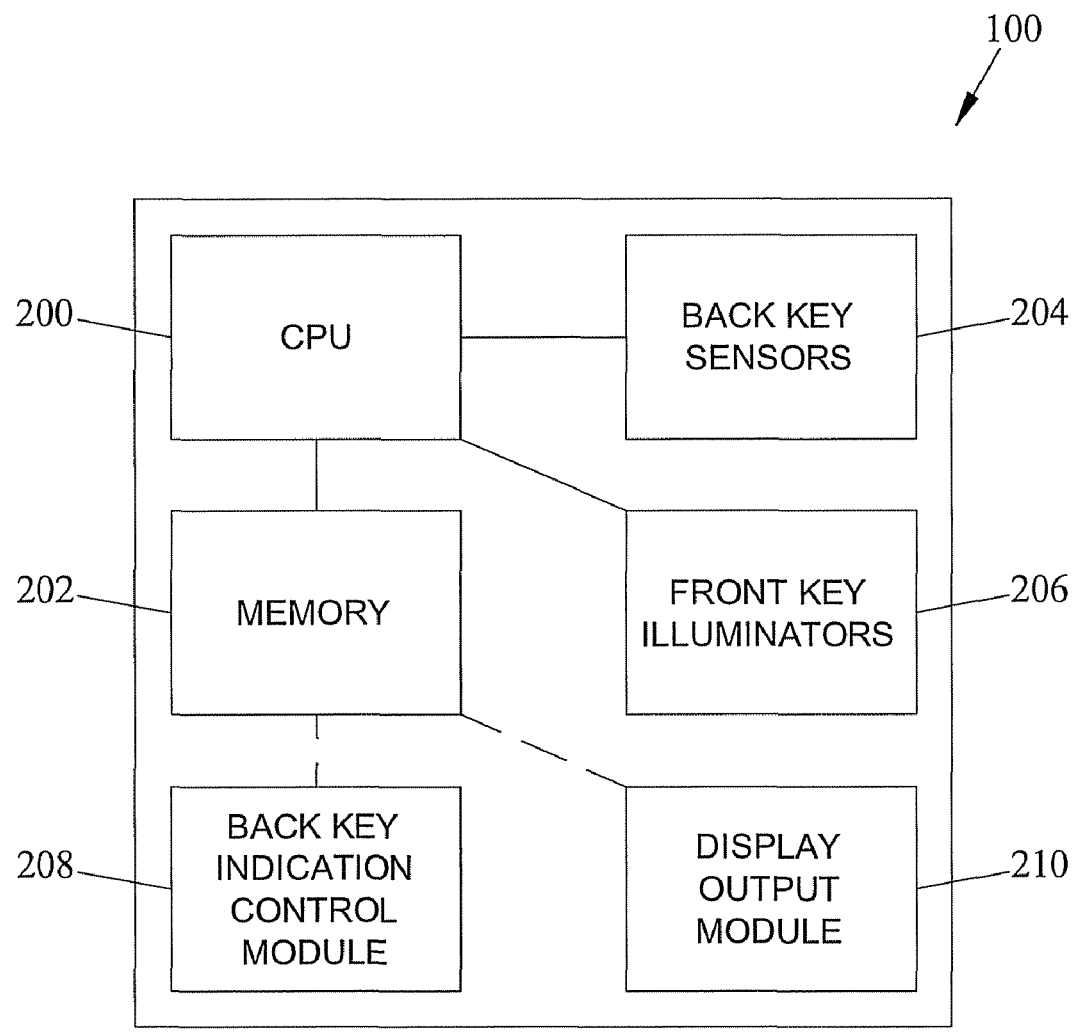
FIG. 2 is a block diagram illustrating exemplary electronic components of an apparatus for ergonomic typing according to an embodiment of the subject matter described herein.

According to another aspect of the subject matter described herein, the keys located on back surface 106 may be multi-position switches where when the user partially depresses one of the switches, the corresponding key on the front surface is illuminated and when the user fully depresses one of the keys, the key is selected and displayed on the display. FIG. 2 illustrates exemplary components of apparatus 100 for effecting this feature. In FIG. 2, apparatus 100 includes a central processing unit (CPU) 200 that controls overall operations of apparatus 100. A memory 202 stores programs and data accessible by CPU 200. Back key sensors 204 determine when a key is partially or fully depressed. Front key illuminators 206 illuminate the front keys. A back key indication control module 208 may determine which key is selected based on input from back key sensors 204 and control the corresponding illuminator of front key illuminators 206 to light the corresponding front key. A display output control module 210 may output a key to display 110 illustrated in FIG. 1 when the key is fully depressed.

In one embodiment, the keys located on the front and back surfaces of apparatus 100 may be electromechanical switches. In another embodiment, either or both keypads may be virtual keypads, such as those currently found on consumer electronic devices. If virtual keys are used, index finger and digits three through five home positioning channels 114A, 114B, 112A, and 112B may be implemented by structures that are affixed to or overlaid on the display glass or plastic. Similarly, partial depression of a key on the back surface may be determined by a pressure sensor or other means that determines the amount of pressure being applied to the virtual key.

According to yet another aspect of the subject matter described herein, the configuration of keys on front surface 102 and back surface 106 may be programmable by the user. For example, front surface 102 and back surface 106 may each include virtual keypads. If virtual keypads are used, the functionality of the virtual keys can be programmed by the user, for example, using a programming interface where the user selects the alphabetic or numeric character corresponding to each key position. According to another aspect of the subject matter described herein, back surface 106 may include boundary lines for further facilitating positioning and typing on back surface 106. Referring again to FIG. 1B, boundary lines 116A-C extend in a direction transverse to channels 112A and 112B and tactically indicate positioning of a user's fingers. Boundary lines 116A-116C may be considered structures for facilitating positioning of the user's fingers when the user's fingers are moving to and from home position keys (i.e., those in channels 112A, 112B, 114A, and 114B) during typing. Boundary lines 116A-116C may be formed in or on second surface 106. In one exemplary embodiment, boundary lines 116A-116C may be walls that extend outward from second surface 106. Boundary lines 116A-116C may separate keys in the second set and may separate regions of second surface with keys from regions without keys.

According to another aspect of the subject matter described herein, cylindrical depressions 118A-118F may be formed in channels 112A and 112B to further facilitate home positioning of digits three through five of a user's fingers. Depressions 118A-118F may surround the corresponding key so that the user may easily locate the key in channels 112A and 112B without having to look at surface 106. Cylindrical depressions may also be formed in channels 114A and 114B to further facilitate home positioning of the user's index fingers.

An apparatus for ergonomic typing according to the embodiments described herein may be used on a modular keyboard enclosure, such as a stand-alone computer keyboard or on a device, such as a mobile phone or PDA. Any device that requires alphabetic input, numeric input or other input where a keyboard is required is intended to be within the scope of the subject matter described herein.

Figure 3A:
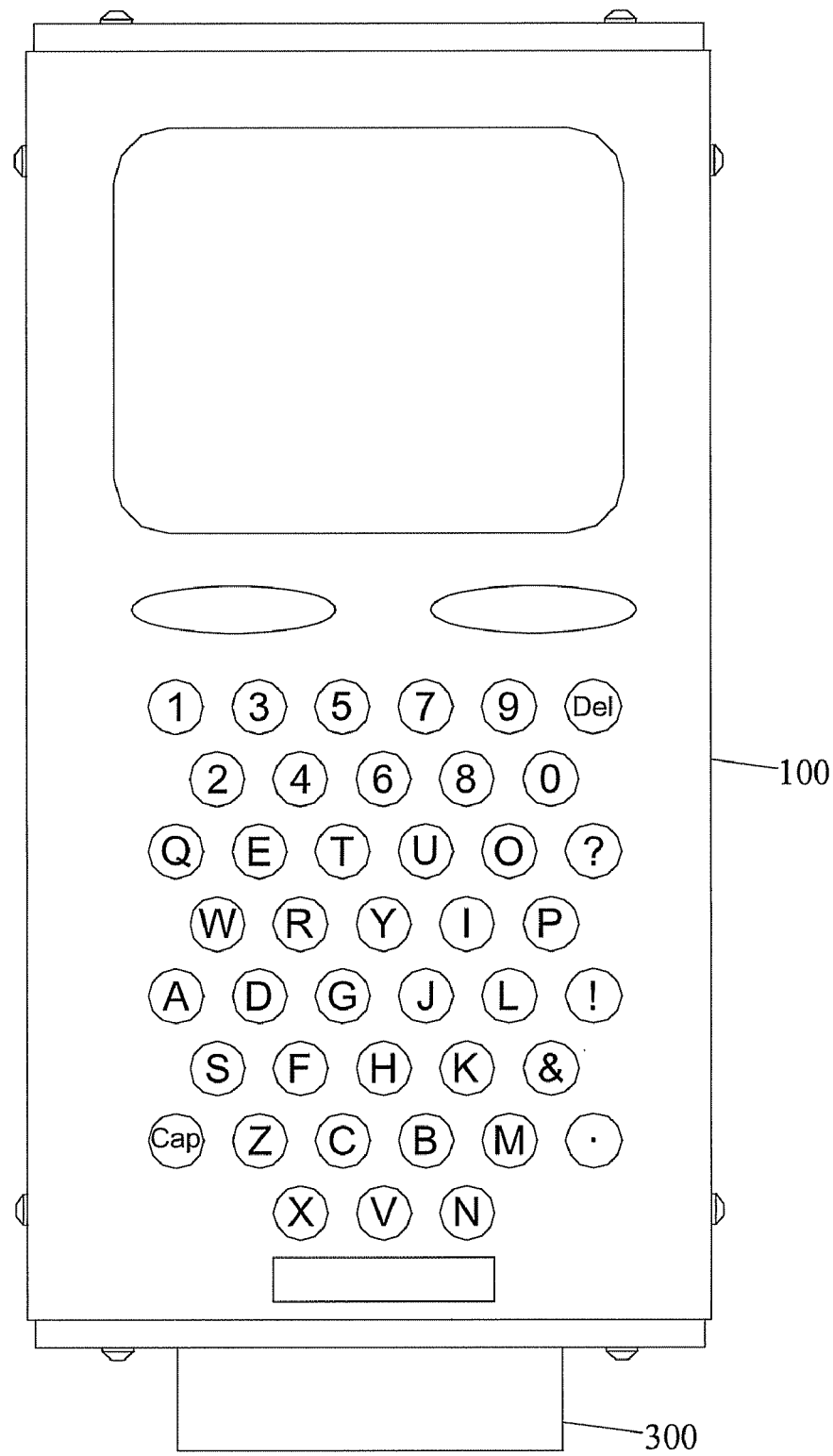
FIGS. 3A-3D are front, side, rear, and bottom views respectively, of an apparatus for ergonomic typing supported by a support member according to an embodiment of the subject matter described herein.
Figure 3B:
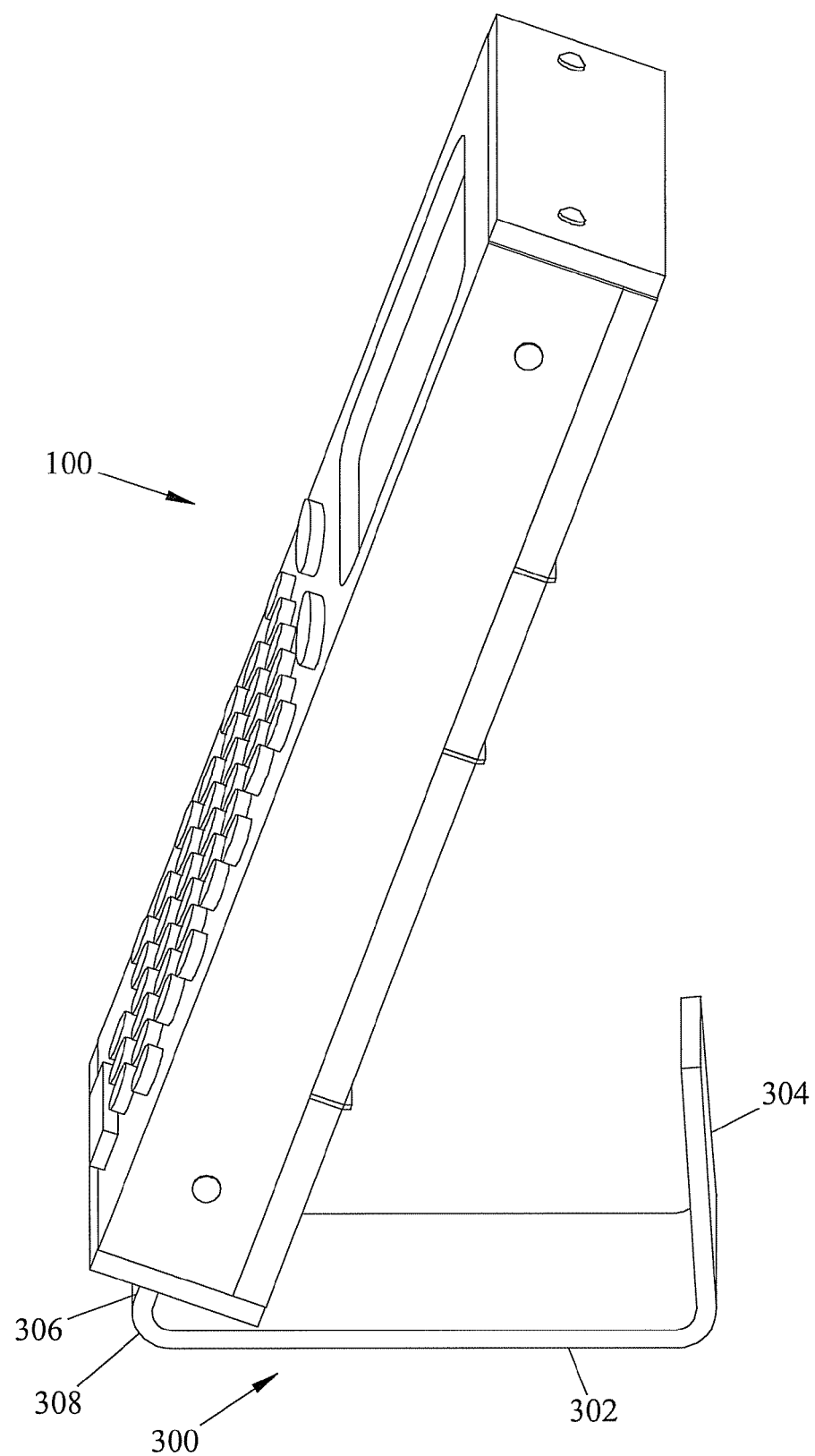

According to another aspect of the subject matter described herein, apparatus 100 may include a support member for supporting the device above a work surface so that the user can access front and back surfaces 102 and 106 without supporting the device. FIGS. 3A-3D illustrate this feature. In FIG. 3A, a front view of a support member 300 is shown. In FIG. 3B, it can be seen that support member 300 includes a first portion 302 for resting on a work surface, a second portion 304 for providing stability, and a third portion 306 for attaching to the body of apparatus 100. Support member 300 may further reduce the stress on a user's fingers and wrists when using apparatus 100.

Figure 3C:
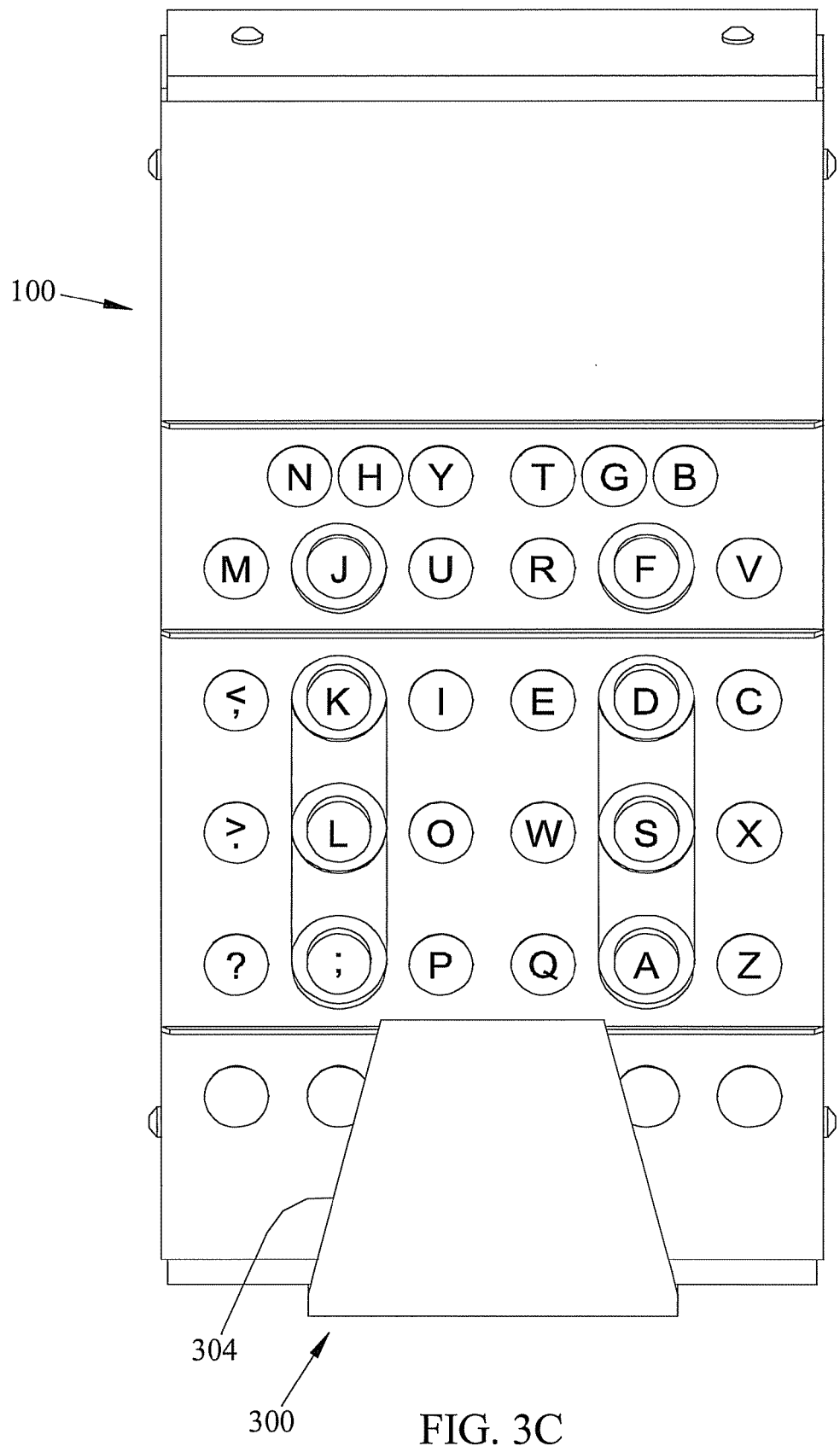

In FIGS. 3B and 3C, it can be seen that support member 300 allows device 100 to incline at an angle with respect to the vertical. This angle may be adjustable by a user to increase comfort for the user during typing. Angular adjustment may be achieved by providing a hinge at bend 308 that is lockable at different angles.

Figure 3D:
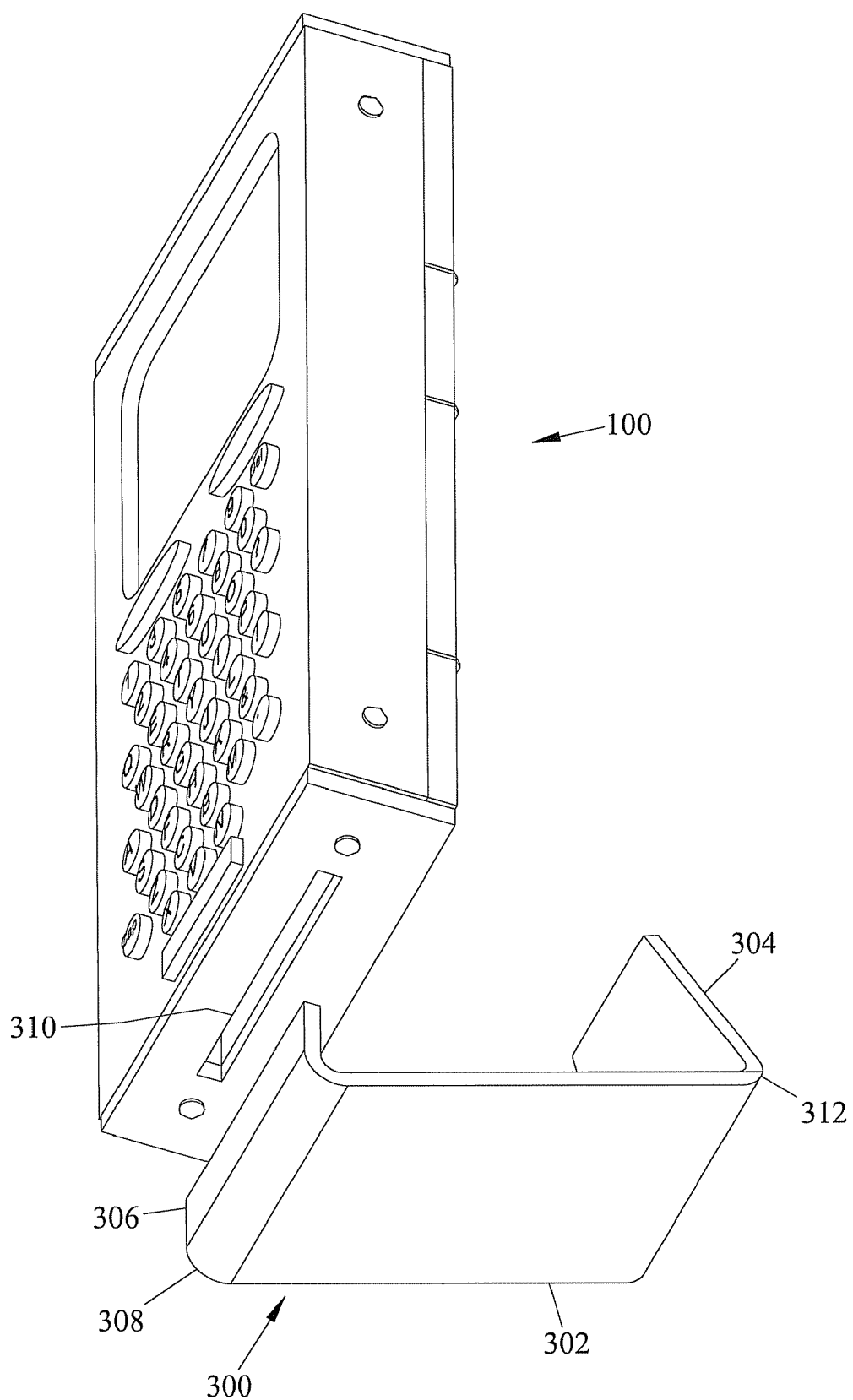

In one embodiment, support member 300 may be detachable from device 100, as illustrated in FIG. 3D. In FIG. 3D, apparatus 100 includes a cavity 310 in which third portion 306 is detachably insertable. In an alternate embodiment, support member 300 may be non-detachable from device 100 and may be retractable into cavity 310 when support member 300 is not in use. In such an embodiment, bend 308 and bend 312 may each include lockable hinges to allow locking into a straight position for insertion of support member 300 into cavity 310.

According to yet another feature of the subject matter described herein, support member may provide for adjustment of the height of apparatus 100 above a work surface to account for different sizes of users' hands. For example, third portion 306 may include a plurality of stops along at different heights along the sides of third portion 306 that interlock with corresponding tabs aperture 310.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An apparatus for ergonomic typing, the apparatus comprising:
a first surface having first set of keys including a plurality of alphabetic keys, the first set of keys being operable by a user's thumbs; and
a second surface opposite the first surface and having a second set of keys including a plurality of alphabetic keys, the second set of keys being operable by the user's fingers which are digits two through five of the user's left and right hands, the second surface including first structures which are home positioning channels recessed in the second surface for home positioning of fingers of the user's left and right hands on home position keys and at least one second structure for positioning of the fingers of the user's left and right hands when moving to and from the home positioning channels during typing, wherein the first structures include digits three through five home positioning channels that each surround a plurality of the home position keys and index finger home position channels, wherein the digits three through five home positioning channels and the index finger home position channels separate the second digit from digits three through five when the user's fingers are in the home positioning channels and wherein the at least one second structure comprises a wall that extends outward from the second surface and laterally across the second surface separating a region of the second surface that includes keys proximal to the index finger home positioning channels from a region of the second surface that includes keys proximal to the digits three through five home positioning channels.

2. The apparatus of claim 1 wherein the keys in the first set are arranged in a substantially QWERTY configuration.

3. The apparatus of claim 2 wherein the second set of keys repeats at least some of the alphabetic keys in the first set and the keys in the second set are arranged in a non-QWERTY configuration.

4. The apparatus of claim 3 comprising means for indicating to the user via the first set of keys when corresponding keys in the second set are at least partially depressed.

5. The apparatus of claim 4 wherein the means for indicating includes a selection indicator for illuminating a key in the first set when a corresponding key in the second set is at least partially depressed.

6. The apparatus of claim 1 wherein the index finger home positioning channels are linearly aligned with the digits three through five home positioning channels.

7. The apparatus of claim 1 wherein the at least one second structure includes a plurality of boundary lines formed in or on the second surface for forming tactile boundaries between a region of the second surface with keys and regions of the second surface without keys.

8. The apparatus of claim 1 wherein the keys that are in the first and second sets are programmable by the user.

9. The apparatus of claim 1 wherein the keys include at least one of electro-mechanical keys and virtual keys.

10. The apparatus of claim 1 comprising a modular keyboard enclosure, wherein the first and second surfaces are located on opposing sides of the modular keyboard enclosure.

11. The apparatus of claim 1 comprising a support member for supporting the first and second surfaces above a work surface.

12. The apparatus of claim 11 comprising a housing that includes the first and second surfaces, wherein the support member is detachable from the housing.

13. The apparatus of claim 11 comprising a housing that includes the first and second surfaces, wherein the support member is retractable into the housing.

14. The apparatus of claim 11 wherein the support member provides for adjustment of a height of the first and second surfaces above the work surface.

15. The apparatus of claim 1 wherein the second set of keys includes a plurality of index finger operated keys that are closer together than at least some of the remaining keys in the second set.

16. The apparatus of claim 1 wherein the first and second surfaces are located on opposing sides of the portable communications device.

17. The apparatus of claim 1 wherein at least one of the first and second surfaces includes a plurality of numeric keys for numeric data entry.

18. The apparatus of claim 17 wherein the second surface includes a raised structure including first and second portions that extend angularly towards each other, wherein the numeric keys are located on the first and second portions.

19. An apparatus for ergonomic touch typing, the apparatus comprising:
   a first surface having first set of keys including a plurality of alphabetic keys, the first set of keys being operable by a user's thumbs; and
   a second surface opposite the first surface and having a second set of keys including a plurality of alphabetic keys, the second set of keys being operable by the user's fingers which are digits two through five of the user's left and right hands, the second surface including first structures recessed in the second surface which are home positioning channels for home positioning of fingers of the user's left and right hands on home position keys and at least one second structure for positioning of the fingers of the user's left and right hands when moving to and from the home positioning channels during typing, wherein the first structures include digits three through five home positioning channels that each surround a plurality of the home position keys and index finger home positioning channels, wherein the digits three through five home position channels and the index finger home position channels separate the second digit from digits three through five when the user's fingers are in the home positioning channels, wherein the at least one second structure comprises a wall that extends outward from the second surface and laterally across the second surface separating a region of the second surface that includes keys proximal to the index finger home positioning channels from a region of the second surface that includes keys proximal to the digits three through five home positioning channels, wherein the index finger home positioning channels include cylindrical depressions in the second surface, and wherein the digits three through five home positioning channels include elongate depressions in the second surface.

20. The apparatus of claim 19 wherein the at least one second structure comprises a plurality of boundary lines formed in or on the second surface for separating a region of the second surface with keys from regions of the second surface without keys.

21. The apparatus of claim 19 comprising a modular keyboard enclosure, wherein the first and second surfaces are located on opposing sides of the modular keyboard enclosure.

22. The apparatus of claim 19 comprising a portable communications device, wherein the first and second surfaces are located on opposing sides of the portable communications device.

23. An apparatus for ergonomic touch typing, the apparatus comprising:
   a first surface having first set of keys including a plurality of alphabetic keys, the first set of keys being operable by a user's thumbs; and
   a second surface opposite the first surface and having a second set of keys including a plurality of alphabetic keys, the second set of keys being operable by the user's fingers, the second surface including first and second index finger home positioning channels recessed in the second surface for respective home positioning of index fingers of the user's left and right hands and first and second digits three through five home positioning channels recessed in the second surface for respective home positioning of digits three through five of the user's left and right hands, wherein the keys in the second set include keys disposed in the index and digits three through five home positioning channels and keys located on opposite sides of the index and digits three though five home positioning channels, wherein each of the digits three through five home positioning channels is continuous and a plurality of home position keys are located in each channel, wherein the index finger home positioning channels and the digits three through five home positioning channels separate the first digit from digits three through five when the user's fingers are in the home positioning channels and wherein the second surface further includes a wall extending outward from the second surface and laterally across the second surface separating a region of the second surface that includes keys proximal to the index finger home positioning channels from a region of the second surface that includes keys proximal to the digits three through five home positioning channels.

24. The apparatus of claim 23 comprising a modular keyboard enclosure, wherein the first and second surfaces are located on opposing sides of the modular keyboard enclosure.

25. The apparatus of claim 23 comprising a portable communications device, wherein the first and second surfaces are located on opposing sides of the portable communications device.

* * * * *